United States Patent [19]
Vliet

[11] Patent Number: 5,201,913
[45] Date of Patent: Apr. 13, 1993

[54] COMPACT DISC REMOVAL DEVICE

[76] Inventor: Kevin V. Vliet, 1866 Royal Ct., Walnut Creek, Calif. 94595

[21] Appl. No.: 853,632

[22] Filed: Mar. 19, 1992

[51] Int. Cl.⁵ .............................................. B25J 15/06
[52] U.S. Cl. .................................................. 294/64.1
[58] Field of Search ........................... 294/64.1–64.3, 294/65, 16, 27.1; 29/743; 269/21; 271/90, 103, 108; 369/291, 292; 901/40

[56] References Cited

U.S. PATENT DOCUMENTS

| | | | |
|---|---|---|---|
| 805,887 | 11/1905 | Smith | 294/64.1 X |
| 1,347,548 | 7/1920 | Menchen | 294/64.1 |
| 1,743,212 | 1/1930 | Harris | 294/64.2 |
| 2,147,907 | 2/1939 | MacChesney | 294/64.1 X |
| 2,209,424 | 7/1940 | Shipman et al. | 294/64.1 |
| 2,243,106 | 5/1941 | Limbert | 294/64.1 X |
| 2,287,576 | 6/1942 | Solomon | 294/64.1 |
| 4,050,729 | 9/1977 | Hutson | 294/64.1 |
| 4,583,343 | 4/1986 | Camp | 294/64.1 X |
| 4,726,615 | 2/1988 | Goldberg | 294/16 |

*Primary Examiner*—Johnny D. Cherry
*Attorney, Agent, or Firm*—Bielen, Peterson & Lampe

[57] ABSTRACT

A compact disc removal device for removing compact discs from their storage cases, the removal device is a hand held implement with an extension having a suction cup that engages the surface of a disc and a fulcrum pad that contacts the pronged center retainer in the case to release the disc from engagement with the retainer during removal, the device including a suction release for disengaging the disc from the removal device when desired.

10 Claims, 1 Drawing Sheet

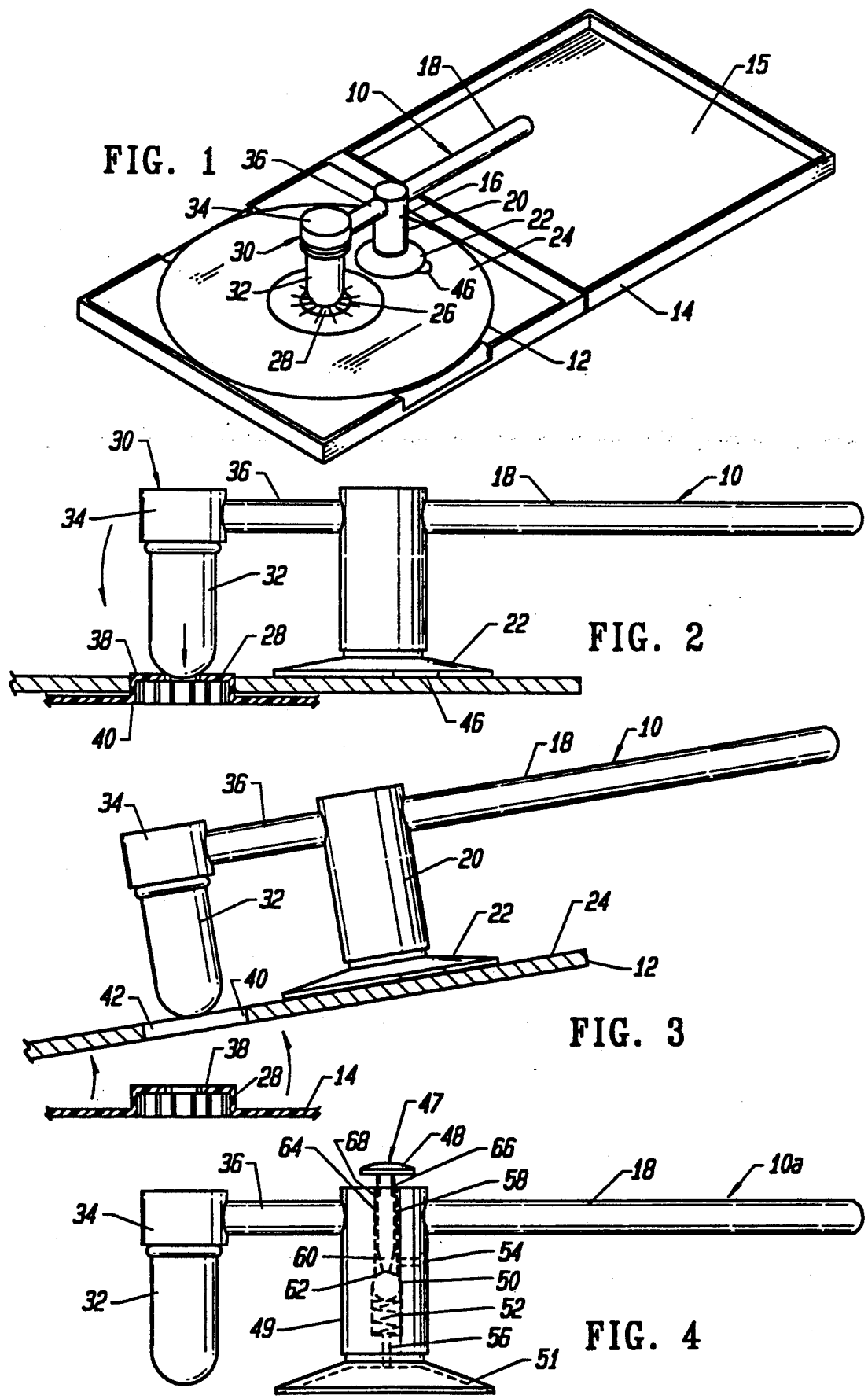

COMPACT DISC REMOVAL DEVICE

BACKGROUND OF THE INVENTION

This invention relates to a compact disc removal device that is useful for extracting a compact disc, also known as a CD, from its case. A compact disc is a recording medium that has virtually replaced vinyl records for the recording and replay of popular and classical music. In addition to business applications, it is expected that the use of a compact disc will extend to various other types of multi-media including information libraries, still images, video chips and storage of documents and the like.

Part of the popularity of a compact disc is that the recorded data is digitalized, such that the replay remains identical to the original without deterioration, as occurs in analog recordings on vinyl phonograph discs, or magnetic tape. The digitalized data on a compact disc is coded on the disc through the imprinting of micro depressions that are read by a laser beam sensing device during playback. The surface of the compact disc is coated with a smooth, clear finish that protects the data from the effects of handling. The popularity of a compact disc is not only due to the fidelity of the recording, but also the ability of the compact disc to withstand rough handling and abuse. Although surface scratches, fingerprints and smudges are alleged not to affect the recording, experience has indicated that the surface condition of a disc can, in fact, affect the tracking of the laser beam and thereby interfere with an accurate playback.

Although the implement devised can be utilized for handling any type of compact disc to advantage, the implement has been devised primarily for use with a compact disc that is contained in a storage case or caddy with means for immobilizing the disc in the case. In the current standard design for music CDs, the means for immobilizing the disc is a type of retainer having flexible center prongs that engage the center hole of the compact disc. The invented implement is particularly useful to disengage the compact disc from this type of retainer means. It is to be understood that the structure of the compact disc removal device disclosed would be modified in construction and size to accommodate data discs used for information storage and retrieval that differ from the standard design currently used for music CD's. In such situations the size of the disc and the means in which to store or contain the disc may vary from product to product and dictate the dimensions and arrangement of elements of a modified removal device.

SUMMARY OF THE INVENTION

The compact disc removal device of this invention comprises an implement for removing a compact disc from a conventional storage case or caddy enabling convenient transport of the removed disc to a desired destination, such as a compact disc player for playback of the data recorded on the compact disc. The implement is also useful for removing the compact disc from the compact disc player and returning the disc to its storage case.

The invented compact disc removal device utilizes a soft, pliable suction cup, mounted on a post connected to a handle that allows convenient transport when the cup engages the surface of the compact disc and couples the disc to the removal device. Preferably, the implement includes a suction release element that enables the suction engagement of the cup to be conveniently released when the disc is placed in its destination place or returned to its storage case.

Furthermore, to facilitate the removal of a compact disc that is stored in a case or caddy having a retaining means, the removal device is equipped with a fulcrum pad that engages the standard storage case retainer to assist in disengaging the compact disc from the case. In the usual construction of the removal device, the fulcrum pad is at the end of a handle extension and is designed to engage a prong retainer situated at the center of a compact disc stored in a storage case. The suction cup is positioned on a post that is between the hand grip portion of the removal device and the distal fulcrum pad. It is contemplated that other storage cases that include a retainer means that is oriented to engage to perimeter of a compact disc, the facing and/or location of the suction cup and post relative to the fulcrum pad may be altered to perimeter the fulcrum pad to engage the case outside of the perimeter of the compact disc. However, for purposes of disclosing the preferred embodiment of applicant's invention, the compact disc removal device is shown with a construction and arrangement that is most suitable for current storage case designs.

As an added convenience, in an alternative embodiment of the compact disc removal device, the suction cup release means may comprise a release valve that releases the suction grip of the suction cup on the disc upon depression of a release button. These and other features of the invention are described in greater detail in the Detailed Description of the Preferred Embodiments that follows.

BRIEF DESCRIPTION OF THE DRAWINGS

FIG. 1 is a perspective view of the compact disc removal device engaging a compact disc in a conventional storage case.

FIG. 2 is a side-elevational view, partially in cross section, of the removal device engaging the compact disc in the storage case of FIG. 1.

FIG. 3. is a side-elevational view, partially in cross section, showing the device of FIG. 2 in the release position.

FIG. 4 is a side-elevational view of an alternate embodiment of the compact disc removal device.

DETAILED DESCRIPTION OF THE PREFERRED EMBODIMENTS

The compact disc removal device, designated generally by the reference numeral 10, is shown in FIG. 1 together with a compact disc 12 and compact disc storage case 14. The disc case is a standard audio disc caddy shown with a cover 15 opened to expose the disc 12. In the embodiment of FIG. 1, the removal device 10 includes a suction engagement means 16 mounted on a handle 18. The engagement means 16 includes a support post 20 and suction cup 22. The handle 18 is an elongated, generally cylindrical structure with an axis from which the axis of the post is substantially perpendicularly oriented. The suction cup 22 is mounted at the end of the post 20 and engages the smooth surface 24 of the disc 12 that is arranged around a center hub 26. The disc case or caddy 14 has a retaining means 28, and the removal device 10 includes a retainer release means 30. The release means includes a contact pad 32 mounted to a connector 34 at the end of a fulcrum extension 36 that extends from the end of the handle 18 as shown in greater detail in FIG. 2. The contact pad 32 engages the storage case retaining means 28 during removal. The retaining means 28 in the standard audio CD storage case comprises a series of radial prongs 38 which engage the edge 40 of the center hole 42 of the compact disc 12.

By positioning the removal device 10 as shown in FIG. 1 and pressing the device downward onto the disc 12, the suction cup 22 vacuum-engages the disc. By lifting upward on the handle 18, the contact pad 32 engages the retaining means 28, and permits the compact disc 12 to be easily disengaged from the storage case 14. Using the fulcrum leverage of the contact pad 32 in engagement with prongs 38 of exemplar storage case 14, as shown in FIG. 3, a torsional motion during the upward lift of the handle depresses the prongs 38 and assists in disengagement of the disc hub 26 from the retainer means 28. The post 20 and contact pad 32 have a construction that enables the handle 18 to be easily grasped by the fingers of a user without interference from the storage case 14 or the disc 12. In this manner, the compact disc 12 can be removed without smudging the surface 24 with the fingerprints of the user. While fingerprint smudges generally do not affect the quality of a recording, oils can attract dust and other particulate matter that may eventually affect the quality of reproduction by destabilizing the tracking of the laser beam of the playback player.

The simple construction of the device as shown in FIG. 2 allows the handle 18 to include an integral fulcrum extension that is passed through a hole in the post 20 before being cemented into position. This allows the spacing between the post 20 and contact pad 32 to be adjusted for optimum adaptation to different size discs in different media. To facilitate disengagement of the suction cup 22 from the disc surface 24, the cup is equipped with a small lift tab 46 which is lifted by the user's fingernail to release the suction and disengage the removal device from the disc.

In the alternate embodiment of FIG. 4, a modified compact disc removal device 10a has a modified structure which includes a release valve mechanism 47. The release valve mechanism has a release button 48 installed on the top of a post 49 for releasing the vacuum suction in a cup 51 by displacing a ball 50 that is spring biased by a compression spring 52 to block an air relief passage 54 that connects to a connecting passage 56 that opens at the center of the suction cup 51. The release button 48 has a stem 58 with a contact end 60 that contacts the ball 50 and displaces the ball away from a shoulder ball seat 62 in an internal cylindrical passage 64 in the post when the release button 48 is depressed by a user's thumb. Similarly, the stem 58 has a narrow neck 66 that causes the enlarged portion of the stem 58 to engage a shoulder 68 in the cylindrical passage 64 to limit the displacement of the button 48 in the relaxed position The structure of the compact disc removal device can be constructed of plastic with a soft rubber or rubber-like suction cup and contact pad.

Using the compact disc removal device with the release button 48 enables the user to simply engage the disc with the suction cup as previously described with the contact pad 32 engaging the retaining means for removal of the disc from the storage case or from the disc player. When the user desires to release the disc from the suction grip of the suction pad 51, the user simply depresses the thumb operated release button 48, which breaks the suction vacuum and releases the disc from the removal device.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A compact disc removal device for removing and transporting a compact disc, having a smooth, flat surface with a central hole from a protective storage case with a center retainer that engages and retains the disc at the central hole, the removal device comprising:

a hand implement with a handle having a suction engagement means mounted on the handle for engaging the surface of the disc without the disc or case interfering with a user's hand on the handle, the handle having further, fulcrum extension means for contacting the center retainer of the storage case when the suction engagement means engages the surface of the disc during leveraged disengagement of the disc from the storage case.

2. The compact disc removal device of claim 1 wherein the handle comprises an elongated structure with an axis and the suction engagement means includes a post joined to the handle and a suction cup mounted on the post with the cup having an axis oriented substantially perpendicular to the axis of the handle.

3. The compact disc removal device of claim 2 wherein the post is connected to the handle, wherein the post has an axis oriented substantially perpendicular to the axis of the handle, with the post having an end on which the suction cup is mounted.

4. The compact disc removal device of claim 2 having a release means for releasing the suction cup from engagement with the surface of the disc.

5. The compact disc removal device of claim 4 wherein the suction cup has a perimeter and the release means comprises a tab on the perimeter of the suction cup.

6. The compact disc removal device of claim 4 wherein the release means comprises a release valve mechanism.

7. The compact disc removal device of claim 6 wherein the release valve mechanism includes an air relief passage communicating with the suction cup.

8. The compact disc removal device of claim 7 wherein the release valve mechanism has a release button, a ball, a ball seat, means to bias the ball against the ball seat wherein the relief passage is blocked, and a stem connected to the release button, the stem having an end contacting the ball, wherein the ball is displaced from the ball seat on depression of the release button by a user's thumb, relieving any suction through the relief passage.

9. The compact disc removal device of claim 1 wherein the fulcrum extension means has a contact pad, the contact pad contacting the storage case when the suction engagement means engages the disc surface, wherein the disc removal from the case is facilitated by the fulcrum extension means and contact pad.

10. The compact disc removal device of claim 1 wherein the retainer contacting means has a contact pad and wherein the contact pad is arranged in relation to the suction engagement means to contact the center retainer when the suction engagement means engages the disc surface during removal.

* * * * *